UNITED STATES PATENT OFFICE.

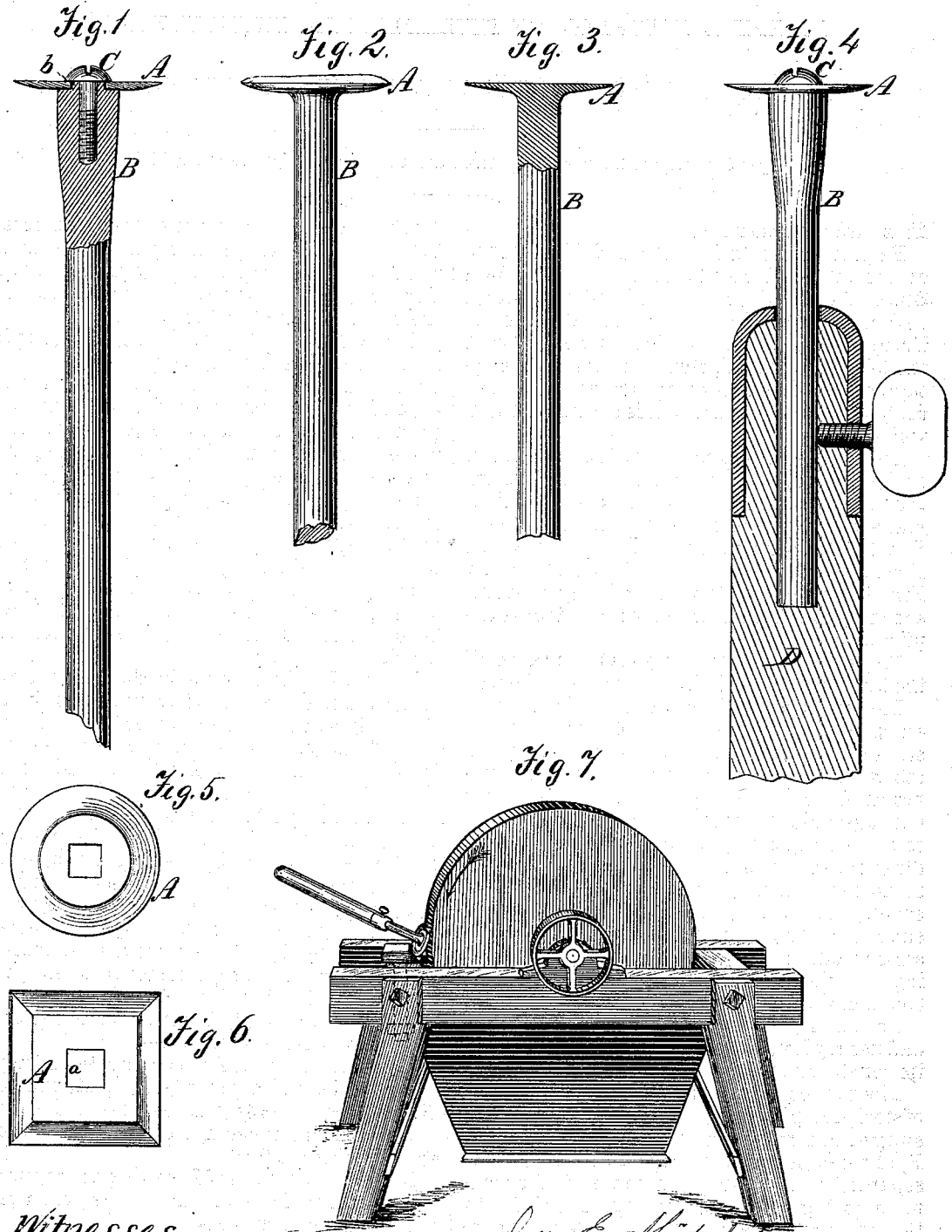

JOSEPH E. MITCHELL, OF PHILADELPHIA, PENNSYLVANIA.

IMPROVEMENT IN TOOLS FOR TURNING STONE.

Specification forming part of Letters Patent No. 125,403, dated April 9, 1872.

*To all whom it may concern:*

Be it known that I, JOSEPH E. MITCHELL, of the city and county of Philadelphia and State of Pennsylvania, have invented certain new and useful Improvements in Tools for Turning Stone; and I do hereby declare that the following is a full, clear, and exact description thereof, reference being had to the annexed drawing making a part of this specification, in which—

Figure 1 is a sectional elevation of one form of my improved tool for turning stone. Figs. 2 and 3 represent tools in which the cutting-blade is swaged on the end of a bar of steel. Fig. 4 represents the tool attached to a handle. Figs. 5 and 6 represent two forms of blades. Fig. 7 is a perspective view of a grindstone, showing the manner in which the tool is applied.

The same letters of reference are used in all the figures in the designation of identical parts.

This invention relates to tools for turning stone of all kinds in the manufacture of grindstones, columns, balusters, capitals, vases, and other ornamental work in stone; and my improvement consists in the employment of a thin cutting-blade of suitable contour, and attached to or formed on the end of the shank or handle of the tool, to stand at right angles thereto, so that in applying the tool it may be held at such an angle on the rest as to cut under the surface or "skin" of the stone and peel off scales from the same instead of simply scraping it in the manner in which the tools now in common use operate.

To enable those skilled in the art to make and use my invention, I will proceed to describe its construction and operation.

The tool consists of a thin cutting-blade, A, of steel properly tempered, which blade is either swaged or formed directly on the end of a bar, B, of steel, as shown in Figs. 2 and 3, or made separately and secured on the end of such a metallic bar, as shown in Figs. 1 and 4. In the latter case the bar B, has a short square projection, $b$, formed on the end to enter a corresponding square aperture, $a$, of the blade and prevent its turning on the rod, to which it is firmly secured by means of a tap-bolt or screw, C. The blade stands at right angles to the rod B, and may be made of any preferred form. For turning moldings its outline will be made the reverse of that of the molding.

I am well aware that tools in general outline similar to those hereinbefore described have been used for turning wood and iron; but when applied to such purposes the bevel must be ground upon the outer face of the cutter to make it effective and lasting. A cutter thus chamfered would practically be inapplicable for turning stone, and, in order to make one serviceable for such work, it is necessary to grind the bevel upon the inner face of the cutter, as clearly shown; and in this novel manner of chamfering the cutter upon its inner face mine is distinguished broadly from the button-head and similar tools for turning metals and wood.

The bar B, which forms the shank of the tool, is secured in the socket of a convenient handle, D, in any suitable manner, when the tool is to be applied by and held in the hands while turning stone. The stone should be made to revolve slowly, and the tool is held on the rest at such an angle that the blade will cut under the surface of the stone and reduce the same to the desired form by peeling off layers in small scales. In this manner stones may be shaped much more rapidly than by the use of the ordinary tools, which can only exert a scraping action; and the tools are also especially adapted for turning grindstones in shops to roughen or sharpen them.

What I claim as my invention, and desire to secure by Letters Patent, is—

A tool for turning stone, composed of a rod or shank, B, and a cutting-blade, A, which is disposed transversely across the end of the shank and chamfered upon its inner face, substantially as set forth.

In testimony whereof I have signed my name to the foregoing specification in the presence of two subscribing witnesses.

JOS. E. MITCHELL.

Witnesses:
EDWARD WILLIAMS,
FREDK. KACHEL.